United States Patent [19]
Nieders

[11] Patent Number: 4,732,280
[45] Date of Patent: Mar. 22, 1988

[54] REEL DISPLAY DEVICE

[76] Inventor: Randal J. Nieders, 14821 Pheasant Hill Ct., Chesterfield, Mo. 63017

[21] Appl. No.: 5,618
[22] Filed: Jan. 21, 1987
[51] Int. Cl.⁴ .............................................. A47F 7/00
[52] U.S. Cl. ....................................... 211/13; 211/4; 211/70.8; 248/551; 248/222.3
[58] Field of Search ................. 211/13, 87, 70.8, 70.6, 211/4; 248/551, 220.2, 222.1, 222.3, 316.2, 316.8, 217.4, 316.4, 313; D22/147; 24/457, 525; 403/282, 277

[56] References Cited

U.S. PATENT DOCUMENTS

| 1,913,988 | 6/1933 | Keefe | 248/250 |
|---|---|---|---|
| 4,103,852 | 8/1978 | Fisk | 248/316.8 X |
| 4,378,882 | 4/1983 | Miller | 206/315 R |
| 4,560,071 | 12/1985 | Downing et al. | 211/70.8 |
| 4,570,757 | 2/1986 | Marzullo | 24/525 X |
| 4,589,170 | 5/1986 | Pointing | 24/457 X |

Primary Examiner—Ramon O. Ramirez
Attorney, Agent, or Firm—Joseph W. Holloway

[57] ABSTRACT

A device for mounting fishing reels on a display panel comprising a shaft which penetrates the panel, sleeves moveably carried on the shaft and operable to clamp a reel to the shaft, and a fastener cooperable with the shaft to secure the device to the panel and to operate the reel clamping sleeves.

15 Claims, 5 Drawing Figures

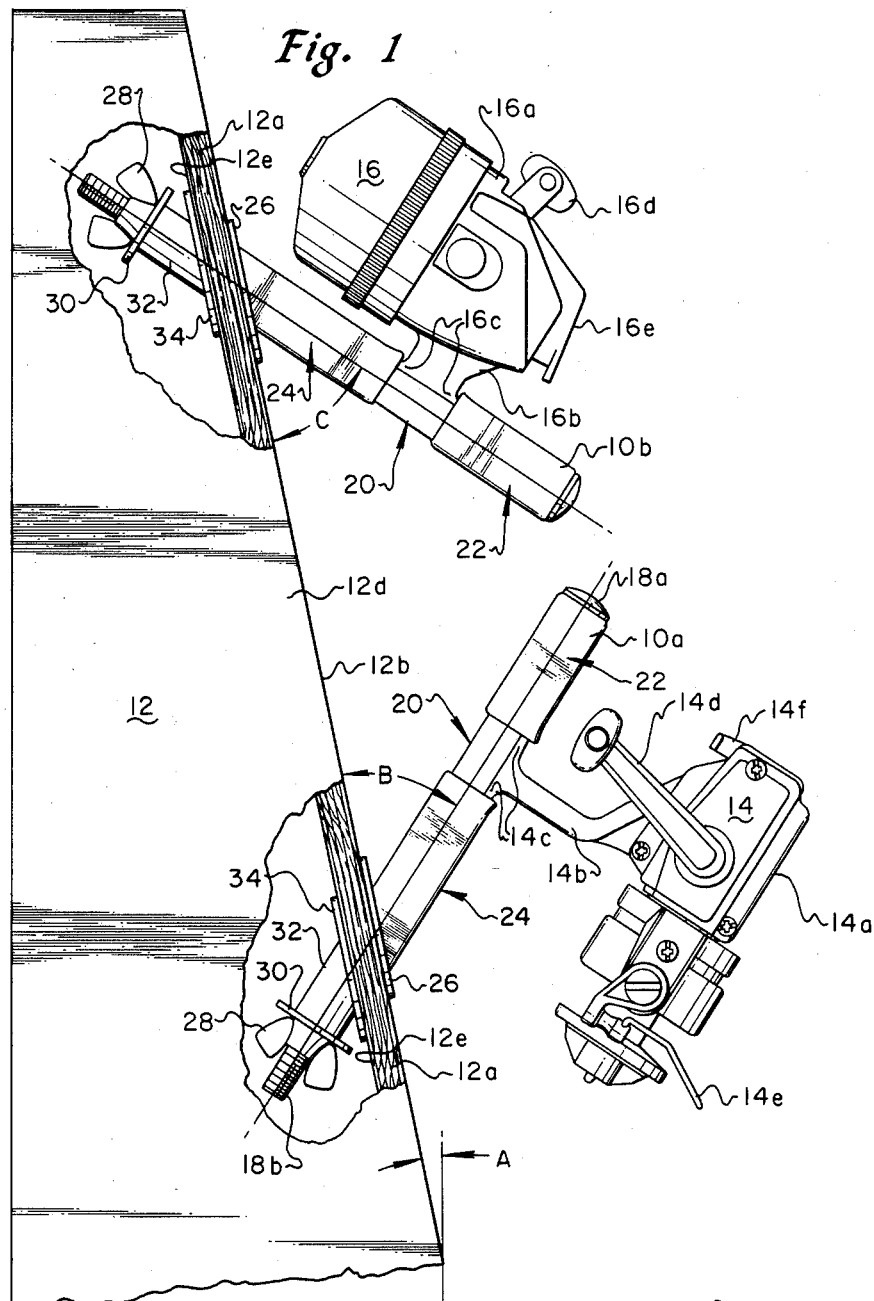

REEL DISPLAY DEVICE

BACKGROUND OF THE INVENTION

This invention relates to a device for displaying fishing reels for greatest sales appeal with least risk of theft or damage.

Customers of self-service stores are generally given full opportunity to handle and examine displayed store merchandise without the attention of store personnel. This method of merchandising reduces the cost of sale and, therefore, reduces the price charged to customers. Since a typical self-service store is large in terms of floor space, enjoys dense customer traffic, and is not designed or staffed for close observation of customer activity, uncommonly high levels of shoplifting and damage of openly displayed merchandise tend to reduce or eliminate the cost advantage of self-service stores over full-service stores. This dilemma is particularly acute in the case of fishing reels because a prospective buyer expects to be able to spin the reel's crank, check its drag and brake, and otherwise handle and operate the reel to gain some sense of its quality, performance and manual feel. However, such relatively expensive display reels are easily damaged by rough handling and are sufficiently compact to be readily concealed and removed from the store premises by a shoplifter.

Heretofore, fishing reels have been displayed using various methods and apparatus none of which reduces the aforedescribed risks of damage and theft to acceptable levels. For example, the display of reels by placing them loosely together on counter tops or in bins subjects such reels to breakage due to being dropped or pushed from the counter and due to reel parts becoming entangled and thereafter damaged by careless customers. Furthermore, even when reels displayed in this manner are secured by safety cables or chains, they are easily stolen by cutting the safety device or detaching it from the reel or the counter with a simple tool.

To avoid damage and theft encountered when reels are loosely displayed, it has been proposed to secure several makes and models of reels to a pipe rack or frame by means of ordinary band-type pipe clamps which overlie the extending feet of the reel pedestal thereby securing them in clamped engagement with a pipe. In practice this display method is highly unsatisfactory due to difficulties encountered by customers attempting to operate the reel, the extreme ease of removal of reels from such clamps, the added risk of injury to customers coming in contact with protruding clamp components, and the crude appearance of the pipes and pipe clamps.

It has also been proposed to mount display reels on individual handle portions of fishing rods, or on an approximation of such handle portion, with the rod end of the handle portion fastened to and projecting from an upstanding panel or partition. Prior U.S. Pat. Nos. 4,378,882 and 4,560,071 suggest this approach; however, neither prior patent shows an effective means for thwarting theft of a reel from the handle since nothing more than conventional keeper rings or nuts are disclosed for securing the reel to the handle. If a reel were shomehow nonremovably attached to the handle of these prior devices, a determined thief could quite easily remove both handle and reel from a display panel by simply detaching the handle from the panel or by breaking off the handle.

SUMMARY OF THE INVENTION

Accordingly, it is the principal object of this invention to provide a panel-mounted store display device for fishing reels which facilitates inspection and handling of such merchandise by customers while reducing to a minimum the risks of damage and theft.

Another important object is to provide an extremely rugged, yet simply and economically constructed mount for display reels which is operable to clamp the extending feet of a reel pedestal to the mount as an incident to drawing the mount into compressive engagement with the front face of a display panel. To this end a rear portion of the mount penetrates through and beyond a receiving aperture in the panel and cooperates with attaching means located rearwardly of the panel to draw and retain the mount in fixed relation with the panel at the same time causing the reel feet portions to be engaged and held by clamping sleeves slideably carried by a front portion of the mount. By locating the attachment means for the mount behind the panel with the reel clamped to the mount projecting outwardly from the front side of the panel, the attachment means is isolated from unwanted tampering intended to remove the reel from the mount or the mount from the panel.

Still another object is to provide an elongated reel mount of the aforedescribed character which is removably attachable to an upstanding flat panel with the mount's longitudinal centerline sloped with respect to the panel face and with the outer end of the mount being gyratory about its point of attachment to the panel. A related object is to provide for attachment of the mount in variable angular relationships to the panel face whereby different types of reels clamped to the mount may be oriented, with respect to the front face of the panel and the mount itself, for optimum visibility, accessability and operbility from a customer position in front of the panel. In the case of a typical casting reel, such optimization is achieved by clamping the reel on top of a mount projecting outwardly and downwardly from the panel at the 6 o'clock position; and, in the case of a typical spinning reel, best results are obtained with the reel clamped below a mount projecting outwardly and upwardly from the panel at the 12 o'clock position.

Yet another object is to provide a reel mount of simple design which can be manufactured at extremely low cost yet is sufficiently strong to resist the most strenous manual efforts to remove a reel clamped to the mount or to break off the mount or pull the mount itself from the panel to which it is fastened. In spite of the rugged character of a mount constructed in accordance with this invention, the conformation of the mount is pleasing to the eye and adds to the overall visual appeal of the reel display.

A still further object is to provide a sizable display panel for carrying a multitude of reel mounts in spaced array. Such panel may advantageously comprise the sloping front wall of an upstanding case or cabinet access to which is controlled by store personnel. In this manner the means for securing the mounts to the display panel are isolated inside the cabinet and are, therefore, inaccessable to shoplifters.

These and other features and objects of this invention and the manner of attaining them will become apparent and the invention will be best appreciated and fully understood by having reference to the following detailed description of an embodiment of the invention taken in conjunction with the accompanying drawings.

DESCRIPTION OF THE DRAWINGS

FIG. 1 is a fragmentary side view of two identical reel mounts attached to a display cabinet;

FIG. 4 is a cross-section taken along lines 4—4 of FIG. 2; and,

FIG. 5 is a cross-section taken along lines 5—5 of FIG. 2.

DETAILED DESCRIPTION OF THE INVENTION

Figures 2, 3:
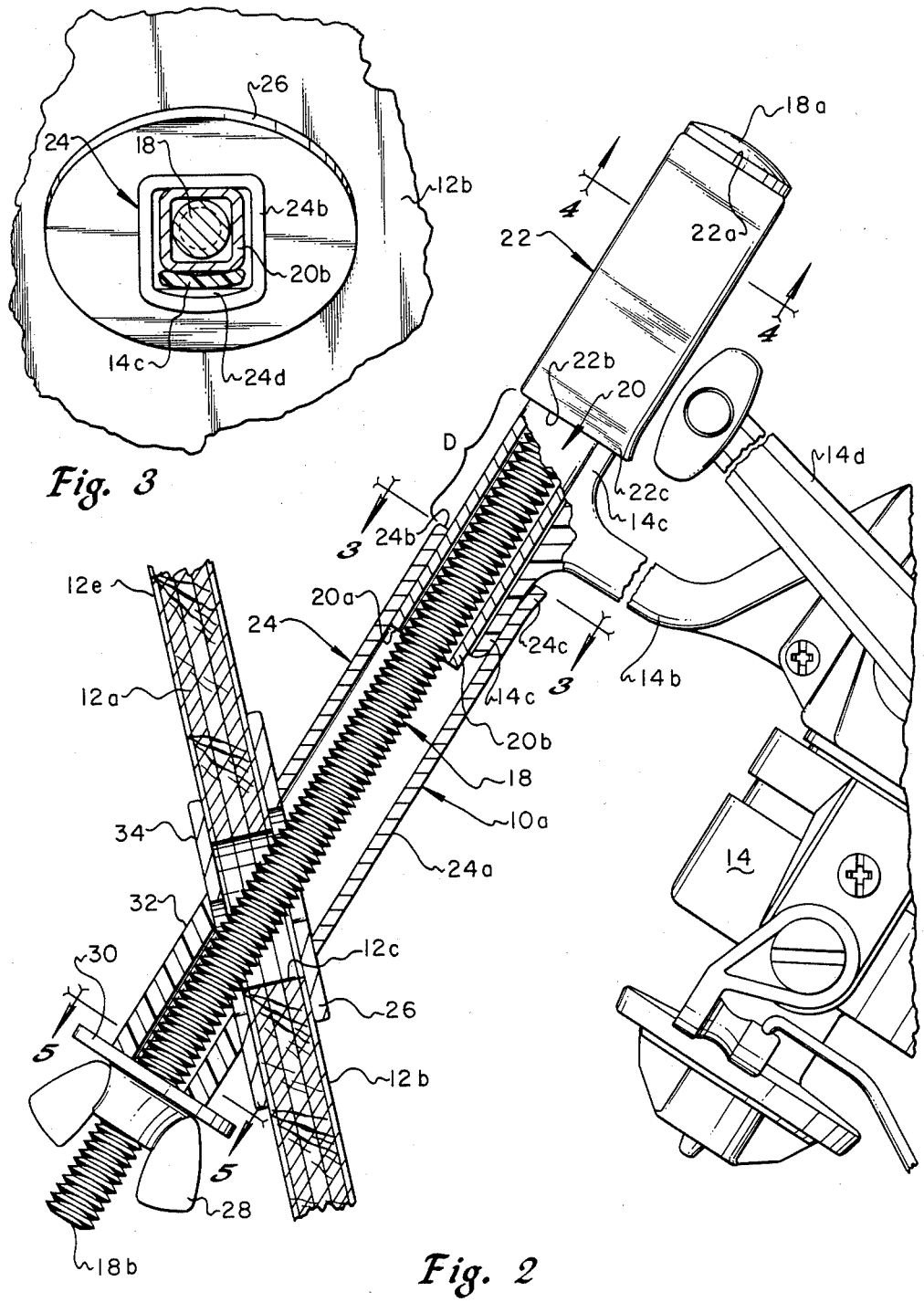
FIG. 2 is an enlarged, fragmentary sectional view of the mount and reel shown in the lower portion of FIG. 1.
FIG. 3 is a cross-section taken along lines 3—3 of FIG. 2.

Two identical reel mounts, indicated in their entireties by numerals 10a and 10b in FIG. 1, are attached to and project from the front of an upstanding display cabinet 12. The lower mount 10a carries thereon a typical spinning reel 14 while a typical casting reel 16 is clamped to the upper mount 10b. As will be more fully disclosed hereinafter, the cabinet 12 may be provided with a large front closure panel 12a having sufficient area for a displayed array of reels of different types, sizes and makes.

The reels 14 and 16 represent the two types of reels which enjoy the largest markets in self-service stores; however, it will be clear from the following description that other types of reels can be advantageously displayed on the mounts and cabinet disclosed herein. Although the structural and operational details of both types of reels vary according to size, model and source of manufacture, the typical spinning reel 14 essentially comprises a body 14a, a pedestal 14b, tapered mounting feet 14c extending perpendicularly at the free end of the pedestal, a reeling crank 14d, a retractable bail 14e and a drag actuater 14f; and, the typical casting reel 16 essentially comprises a body 16a, a pedestal 16b, mounting feet 16c, a reeling crank 16d, and a brake actuator 16e. The depicted reels are attached to mounts 10a and 10b, respectively, in the same relationship as such reels would be mounted on actual spinning or casting rods. Thus, spinning reel crank 14d is located to the left-hand side of the longitudinal centerline of mount 10a, as viewed by a customer looking to the cabinet 12 from a position at the right-hand side of FIG. 1. On the other hand, casting reel body 16a rests above mount 10b on pedestal 16b while crank 16d is located on the right-hand side of mount 10b.

In the preferred cabinet construction, the front panel 12a is sloped from vertical toward the rear of the cabinet through an angle A. The reel mounts 10a, 10b do not extend perpendicularly from the flat front panel surface 12b, but slope at angles B and C, respectively, whereby mount 10a is elevated above horizontal through an angle equal to the sum of angles A and B while mount 10b is depressed from horizontal through an angle equal to the difference between angle C and angle A. Aided by practical experimentation, the angles A, B and C were selected to optimize visual inspection and manual handling and operation of the reels 14 and 16 by a customer even where a multiplicity of reels are compactly mounted on panel 12a in vertically and horizontally extending rows. Thus angle A is preferably about 15° whereby the exterior features of any reels mounted below the vertical midpoint of a typical panel 12a are more readily visible to a customer standing near to and facing the front panel surface 12b. Preferably the angles B and C are equal and are about 45°. Thus the mount 10a extends 60° up from horizontal and mount 10b extends 30° down from horizontal. A mount orientation of this type displays features of both reels to greater advantage than would be the case if the mounts 10a and 10b projected perpendicularly from the panel face 12b. Moreover, since the angles adjacent selected angles B and C are 135°, sufficient space is provided between the respective mounts 10a and 10b and panel surface 12b to accommodate reel 14 which must underlie mount 10a and reel 16 which must overlie mount 10b in order to situate the respective cranks and controls of the reels in a natural location expected by a customer handling the reels. The principal advantage of making angles B and C alike is to facilitate interchangeability of mounts and reversibility of an individual mount from the 12 o'clock attitude of mount 10a to the 6 o'clock attitude of 10b, and vice versa.

Having described the preferred angularity and orientation of the mounts 10a and 10b with respect to typical reels 14 and 16 and with respect to a preferred display cabinet 12, the structure and mode of operation of the mount itself will be described in detail having reference principally to mount 10a since it is shown in detail in FIGS. 2 through 5.

The mount 10a includes an elongated shaft 18 which is threaded along the major portion of its length and which terminates at its free end or forward end in an enlarged, convex head 18a while its rear end 18b is extendable through an aperture 12c in the panel 12a. A intermediate portion of shaft 18 is disposed interiorly of a surrounding tubular clamping rod or bar 20 which in nonrotatably fixed to the shaft 18 at one end 20a, by welding or the like. The shaft has a round cross-section while the bar 20 is square in cross-section; and, as best shown in FIGS. 3 and 4, only slight clearance is provided between the exterior surface of shaft 18 and the interior wall surfaces of bar 20. The bar 20 is longitudinally fixed to the shaft 18, by attachment in the afore-described manner, with the enlarged head 18a in overlying abutment with that transverse end surface, not shown, of bar 20 which is opposite to the end surface 20a, whereby the overlain end of bar 20 is closed and the periphory of the head 18a extends slightly beyond the exterior flat walls of bar 20 for a purpose to be described. While the shaft 18 and bar 20 may comprise a common headed bolt and a length of square tubing, respectively, the equivalent of these elements may be formed as an integral piece if so desired.

Slideably carried on bar 20 are a front clamping sleeve 22 and a rear clamping and attaching sleeve 24. The sleeves 22, 24 are square tubular members with an interior dimension being somewhat greater than the exterior dimension of square bar 20, whereby only a limited degree of rotation of bar 20 relative to sleeves 22, 24 is possible. As shown in FIG. 2, the axial sliding movement of sleeve 22 and bar 20 relative to one another is limited in one direction by abutment of the shaft head 18a and the extreme end surface 22a of sleeve 22.

A flat annular base or pressure foot 26 is fixedly attached, by welding or the like, to and in coaxial alignment with the rear end of sleeve 24. A flat face of the foot 26 abuts and partially closes the rear end of sleeve 24 which slopes with respect to the longitudinal centerline of the sleeve. This angle of attachment of the foot 26 and sleeve 24 of each mount establishes the angles B and C at which the mounts 10a and 10b project from the cabinet panel 12a. At its forward end, sleeve 24 surrounds a portion of the clamping bar 20 and opens toward the opposing open end of sleeve 22. The oppositely facing transverse end surfaces 22b and 24b, respectively, of sleeves 22 and 24 are spaced apart along the length of clamping bar 20 a distance denoted D in FIG. 2 when the reel 14 is fully clamped to mount 10a and the mount is firmly attached to panel 12a as will be more fully described.

As viewed in FIGS. 2 and 3, the long bottom wall 24a of sleeve 24 terminates at its forward end in a portion 24c deformed slightly downwardly to enlarge the opening of the sleeve in an outward radial direction. Such deformation of wall 24a provides a flared surface 24d which serves as a guide-in surface for one of the feet 14c of reel 14 which is received and clamped between the interior surface of wall 24a and the opposed exterior surface of the bottom wall 20b of the clamping bar 20. In the identical manner, the bottom wall 22c of the sleeve 22 is deformed to guide and receive the other reel foot 14c for clamping the same between the wall 22c and clamping bar wall 20b.

In a preferred installation of several mounts made in accordance with this invention, the cabinet 12 or an equivalant enclosure is employed to isolate the threaded shaft ends 18b within the interior space of the cabinet defined by the front panels 12a, spaced side panels 12d and top and back panel, not shown. The back panel may be opened for access to the back surface 12e of the front panel whereby, in a manner to be described, the shaft 18 can be removably attached to the front panel 12a. The bottom of the cabinet may be closed by a base, not shown, or may be closed by a floor surface on which the cabinet rests. Instead of a back closure panel or door, the cabinet may be positioned with respect to a wall or other upright surface so that the interior of the cabinet is not accessible to store customers.

Turning now to the means by which the mounts 10a, 10b are secured to the panel 12a, a fastener 28 threadably coacts with the rear end 18b of the shaft 18 to clamp a first washer 30, a spacer 32 and a second washer 34 in surrounding relation with shaft 18 between the fastener 28 and rear panel surface 12e. In the assembled relation shown in FIG. 2, the flat washer 30 bears against the wing nut 28 and, in turn, provides an annular bearing surface for the spacer 32 which comprises a hollow cylinder having a sloped annular end wall opposite washer 30. The flat washer 34 which is captured between the sloping spacer end wall and the rear panel surface 12e may conveniently have the same external and internal dimensions as the annular foot 26. The slope of the spacer wall is made the same as that of the sloped rear end wall of sleeve 24 to provide parallelism of the washer 34 and foot 26 to assure flush bearing engagement of the foot 26 and the washer 34 against the front and back panel surfaces, 12b and 12e respectively. The length of the spacer 32 is made great enough to prevent contact between the washers 30 and 34 when the nut 28 is fully tightened on shaft 18.

To provide sufficient strengh in the cabinet-mount combination to resist breaking of the cabinet or mount by a shoplifter, the cabinet panel 12a is made of plywood sufficiently thick to prevent tearing out of the front cabinet wall 12a about the foot 26; and, the bar 20 and sleeves 22 and 24 are square metal tubes having sufficient wall thickness to prevent manual bending or twisting off of the mount itself. The spacer 32 is conveniently and cheaply made from nonmetallic tubing and the members 30 and 34 as well as foot 26 may be common washers. For convenience in assembly the functions of the washers 30 and 34 and the spacer 32 could be combined in a one-piece member if desired.

Having disclosed in detail the structure of one preferred embodiment of the invention, the operation of the mount to secure it to the cabinet and to secure a reel to the mount will now be described.

With the parts of the mount completely disassembled from the cabinet panel 12a and from one another, the front clamping sleeve 22 is first positioned about the clamping bar 20 with transverse end surface 22a in abutting relation with the radially extending shaft head 18a. A reel of any selected type is then oriented with its forward end pointing toward the end 18b of the shaft 18. The reel mounting foot 14c which projects toward the head shaft 18a is then inserted into the lead-in opening between clamping bar wall 20b and the outwardly flared portion of sleeve wall 22c. Insertion of foot 14c between the bar 20 and sleeve 22 is limited in an axial direction by the wedging action of the tapered foot as it slides between the bar and sleeve. As an incident to penetration of the sleeve 22 by foot 14c, the sleeve and the bar 20 are urged radially toward one another until they are in surface-to-surface contact at a location opposite the foot 14c.

The rear clamping and attaching sleeve 24 is then positioned on the shaft 18 with the flared guide-in portion 24c opening toward its counterpart guide-in portion on the front clamping sleeve 22. The sleeve 24 is moved axially along the shaft 18 until the bar 20 and the underlying rear reel foot 14c are wedged within the forward end of sleeve 24, sustantially as shown in FIG. 2, with the upper surface of the bar urged into surface-to-surface contact with the upper wall of the rear sleeve 24, as viewed in FIG. 3.

With the reel display device assembled in the manner and to the extent described above, the threaded shaft 18 extends through the central aperture in the foot 26 and the reel 14 is located but not yet clamped on the shaft by the sleeves 22 and 24. The rear shaft end 18b is then inserted through the panel aperture 12c and beyond until the sloped surface of the pressure foot 26 is flush against the front panel surface 12b. From the rear of the panel, the washer 34, spacer 32, and washer 30 are assembled on the shaft 18 in that order; and, the wingnut 28 is actuated in the tightening direction causing the washer 30 to advance toward the back panel surface 12e. Before the nut 28 is fully tightened, the spacer 32 should be rotated about the shaft 18 so that its sloping end surface will bear against the washer 34 in such a manner as to tilt the latter about the shaft 18 for flush surface engagement with the back panel surface 12e, as best shown in FIG. 2. Continued actuation of the nut 28 after the washer 30, spacer 32 and washer 34 are aligned and compressed between the nut and the back panel surface 12e will axially move the shaft 18 rearwardly through aperture 12c causing the shaft head 18a to urge the front clamping sleeve 22 to override the tapered front reel foot 14c thereby firmly wedging it between the bar 20 and the sleeve 22. Likewise, the foot 26 of rear clamping sleeve 24 is pressed rearwardly against the front panel surface 12b due to frictioned engagement between the wedging surfaces of reel foot 14c, bar 20 and sleeve 24.

When the wingnut 28 is fully tightened, the pressure foot 26 and the washer 34 engage the panel 12a compressively therebetween to prevent either axial or rotory movement of the shaft 18 with respect to the panel; and, feet 14c of the reel 14 are respectively clamped between the bar 20 and the sleeves 22, 24; the angle B between the panel surface 12b and the centerline of mount 10a is established and maintained by the foot 26; and, the orientation of the reel 14 with respect to the mount 10a and the orientation of the mount with respect to the panel 12a will be maintained.

Although many of the benefits of this invention can be realized if the slope of the foot 26 of the clamping sleeve 24 is modified so that the shaft 18 always projects perpendicularily from the panel 12a, the opportunity afforded a customer to inspect and handle a reel is substantially enhanced if the angles B and C are 45°. To permit use of identically constructed mounts to carry spinning reels below a mount and casting reels above a mount, it is desirable that each mount be adapted for installation in either the angularly ascending attitude, according to mount 10a, or in the angularly depending attitude, according to mount 10b. However, when the mounts are to be displayed for customer inspection, the selection of angular attitude of a mount and selection of reel location on that mount is dictated by the real life location of the reel winding crank. Thus, for a spinning reel 14 the crank handle 14d is intended to be operated by the user's left hand; and, in the case of a casting reel 16 the crank handle 16d is operated by the user's right hand. Therefore, a spinning reel mount, 10a for example, projects upwardly at a 12 o'clock position with the pedestal feet 14c clamped below the clamping bar 20 while the casting reel mount, 10b for example, has the shaft 18 inverted through 180° so that its shaft 18 projects downwardly at the 6 o'clock position with the pedestal feet 16c clamped against the upper surface of clamping bar 20. While a mount constructed in accordance with this invention could be clamped to the panel 12a with the shaft 18 projecting at any desired clock location, the opposed 12 o'clock and 6 o'clock positions satisfy the requirements for displaying most types of fishing reels.

Once the mount is attached to a cabinet in the manner described above, the displayed reel may be removed or changed by loosening the wingnut 28 sufficiently so that the distance D, shown in FIG. 2, becomes great enough to permit the pedestal feet 14c to be disengaged from the clamping sleeves 22 and 24. Such disengagement can usually be accomplished without removal of wingnut 28 from the shaft 18 or disassembly of any other part from its position on the shaft 18. Should it be desired to use the illustrative spinning reel mount 10a to display instead a casting reel 16, the spinning reel is first removed in the manner just described; and, with the wingnut 28 loosened, the front end of the mount 10a is gyrated through a 180° arc to the 6 o'clock position as shown in the upper portion of FIG. 1. As an incident to such inversion of angular attitude, the rear sleeve 24 of mount 10 rotates 180° to maintain more or less flush contact between the foot 26 and the front panel surface 12b. Since the sleeves 22, 24 are nonrotatably linked by the bar 20, the front sleeve 22 will rotate with the rear sleeve 24 whereby both the aforedescribed lead-in portions of the sleeves will be located in the now inverted position at the upper surface of the rod 20. The substituted casting reel 16 may now be clamped to the inverted mount 10a by tightening the wingnut 28.

Another advantageous feature of this invention is that empty mounts may be stored in place on the panel 12a.

In this storage mode, the wingnut 28 is tightened sufficiently to draw the transverse sleeve surfaces 22b and 24b into abutting contact and continued tightening of nut 28 causes the pressure foot 26 and washer 34 to engage the opposite surfaces of panel 12a as hereinbefore described.

While only two illustrative mounts are shown attached to the partial cabinet panel 12a, a multiplicity of identical mounts may be used to display a large variety of brands, sizes and types of reels on a cabinet front having a number of horizontally and vertically spaced rows of apertures 12c through which mounts are secured.

The foregoing description of a preferred embodiment of the invention is illustrative and explanatary only and various changes in the size, shape, and materials as well as in specific details of the illustrated construction may be made without departing from the scope and spirit of the invention.

What I claim as my invention is:

1. In a device for attaching a reel to a flat panel having wall surfaces connected by an aperture, the improvement comprising:
    an elongated member adapted to have its longitudinal axis penetrate said aperture with a portion of said member extending beyond each of said wall surfaces;
    reel holding means attached to one extending portion;
    actuating means for said reel holding means attached to the other extending portion; and,
    said reel holding means and said actuating means providing coacting means for securing said member to said panel.

2. The improvement according to claim 1, wherein said reel holding means includes elements penetrated by said member and moveable with respect thereto and with respect to one another.

3. The improvement according to claim 2, wherein said elements are spaced longitudinally on said member to receive mounting means for a reel; and,
    said actuating means operably engages said member to provide movement of said member with respect to said panel to move said elements axially together to hold said mounting means.

4. The improvement according to claim 3, wherein one element has limited movement on said member, and another element is compresively urged against a panel wall surface.

5. The improvement according to claim 1, wherein said reel holding means includes an element for engaging said panel.

6. The improvement according to claim 5, wherein said reel holding means is attached to said one extending portion in telescoping relation therewith; and,
    said element is attached to said reel holding means in sloped relation to both said reel holding means and said member, whereby said reel holding means and said member both slope with respect to said panel when said element is in flush engagement with said panel.

7. The improvement according to claim 1, wherein said reel holding means and said actuating means provide first and second elements for engaging said panel.

8. The improvement according to claim 7, wherein each of said elements is movable in response to operation of said actuating means and with respect to said member for engagement with a wall surface of said panel.

9. The improvement according to claim 8, wherein at least one of said elements includes a flat surface engaging a wall surface of said panel and sloping with respect to the longitudinal axis of said member.

10. The improvement according to claim 7, wherein said elements are parallel with said panel walls and slope with respect to the longitudinal axis of said member.

11. The improvement according to claim 8, wherein said first element terminates in an annular base providing one flat surface and said second element comprises an annular member providing another flat surface.

12. A reel display device comprising:
an enclosure having a wall panel;
a shaft penetrating said panel;
reel holding means carried on said shaft outside said enclosure;
shaft inside and outside said enclosure mounting means carried on said shaft;
common actuating means for said reel holding means and said shaft mounting means to secure a reel to said shaft and said shaft to said panel; and,
said common actuating means attached to said shaft inside said enclosure.

13. The invention according to claim 12, wherein:
said reel holding means includes a first sleeve sloping from a rigidly attached flat base and said first sleeve supports a portion of said shaft; and,
said base being disposed flat against said panel when said shaft is mounted on said panel whereby said first sleeve and said shaft portion supported thereby slope with respect to said panel.

14. The invention according to claim 13, wherein:
said reel holding means comprises said first sleeve and a second sleeve;
said second sleeve is movably carried on said shaft; and,
said sleeves nonrotatably engage said shaft to hold said reel in radially spaced relation to said shaft.

15. The invention according to claim 13, wherein:
said shaft is angularly movable with respect to said panel with said flat base in sliding contact with said panel, whereby the slope of said shaft relative to said panel is maintained after such movement.

* * * * *

UNITED STATES PATENT AND TRADEMARK OFFICE
CERTIFICATE OF CORRECTION

PATENT NO. : 4,732,280

DATED : March 22, 1988

INVENTOR(S) : Randal J. Nieders

It is certified that error appears in the above-identified patent and that said Letters Patent is hereby corrected as shown below:

Claim 12, line 18, cancel "inside and outside said enclosure"; line 19, after "shaft" insert--inside and outside said enclosure--.

Signed and Sealed this

Eighteenth Day of October, 1988

Attest:

DONALD J. QUIGG

*Attesting Officer*           *Commissioner of Patents and Trademarks*